United States Patent
Fu et al.

(10) Patent No.: US 11,853,449 B1
(45) Date of Patent: Dec. 26, 2023

(54) DATA PROCESSING METHOD BASED ON SECURE MULTI-PARTY COMPUTATION, ELECTRONIC DEVICE, AND STORAGE MEDIUM

(71) Applicant: Harbin Institute of Technology, (Shenzhen) (Shenzhen Int'l Technical Innovation Research Institute), Shenzhen (CN)

(72) Inventors: Ximing Fu, Shenzhen (CN); Chuanyi Liu, Shenzhen (CN); Mo Li, Shenzhen (CN)

(73) Assignee: Harbin Institute of Technology, (Shenzhen) (Shenzhen Int'l Technical Innovation Rearch Institute), Shenzhen (CN)

( * ) Notice: Subject to any disclaimer, the term of this patent is extended or adjusted under 35 U.S.C. 154(b) by 0 days.

(21) Appl. No.: 18/181,972

(22) Filed: Mar. 10, 2023

(30) Foreign Application Priority Data

Oct. 10, 2022 (CN) .......................... 202211231067.7

(51) Int. Cl.
G06F 21/62 (2013.01)
G06F 17/16 (2006.01)
G06F 21/60 (2013.01)

(52) U.S. Cl.
CPC .......... G06F 21/6218 (2013.01); G06F 17/16 (2013.01); G06F 21/602 (2013.01)

(58) Field of Classification Search
CPC ..... G06F 21/6218; G06F 17/16; G06F 21/602
See application file for complete search history.

(56) References Cited

U.S. PATENT DOCUMENTS

| | | | | |
|---|---|---|---|---|
| 11,431,470 B2* | 8/2022 | Jiang | ...................... | H04L 9/0631 |
| 2002/0016773 A1* | 2/2002 | Ohkuma | .................. | H04L 9/002 |
| | | | | 705/50 |
| 2017/0118011 A1* | 4/2017 | Shibutani | .................. | H04L 9/14 |
| 2017/0228547 A1 | 8/2017 | Smith et al. | | |
| 2019/0205568 A1* | 7/2019 | Veugen | ................... | H04L 9/085 |

FOREIGN PATENT DOCUMENTS

| | | |
|---|---|---|
| CN | 113127927 A | 7/2021 |
| CN | 114157415 A | 3/2022 |
| CN | 114244853 A | 3/2022 |
| CN | 114785620 A | 7/2022 |
| WO | 2021190424 A1 | 9/2021 |

* cited by examiner

*Primary Examiner* — Meng Li
(74) *Attorney, Agent, or Firm* — The Webb Law Firm

(57) ABSTRACT

A data processing method based on secure multi-party computation, an electronic device and a storage medium are disclosed. The data processing method requires firstly obtaining original confidential data and shared key information from a data holding terminal; performing a first encrypting process to the original confidential data based on the shared key information to generate original encrypted data; and then sending the original encrypted data to a node server. Further, the node server obtains a plurality of pieces of the original encrypted data, and performs a service parsing process to generate encrypted result data, and sends the encrypted result data to a data reconstruction terminal. Furthermore, the data reconstruction terminal obtains the encrypted result data and the shared key information, and performs a reconstructing process to the encrypted result data according to the encrypted result data and the shared key information to obtain service result data.

8 Claims, 5 Drawing Sheets

DATA PROCESSING METHOD BASED ON SECURE MULTI-PARTY COMPUTATION, ELECTRONIC DEVICE, AND STORAGE MEDIUM

CROSS-REFERENCE TO RELATED APPLICATION

This application claims priority to Chinese Patent Application No. 202211231067.7, filed Oct. 10, 2022, the disclosure of which is hereby incorporated by reference in its entirety.

TECHNICAL FIELD

The present disclosure relates to the technology field of data processing, in particular to a data processing method based on secure multi-party computation, an electronic device, and a storage medium.

BACKGROUND

With the development of science and technology, people pay more and more attention to data security. Secure Multi-Party Computation (SMPC) is used to solve the problem that a group of processing nodes distrusting each other respectively hold secret data and collaboratively compute a given function. Secure multi-party computation ensures that the processing nodes can obtain correct computation results while not obtaining any information beyond the computation results. During the entire computing process, each processing node always has absolute control over the data it owns.

In the related art, secure multi-party computation can be regarded as a cryptographic basis for implementing many applications such as electronic election, threshold signature and electronic auction, and is widely used in the technical field of data processing. However, in most cases, the efficiency of data processing process based on secure multi-party computation is relatively low. Therefore, how to improve the data processing efficiency in the data processing process based on secure multi-party computation has become a major problem to be solved urgently in the industry.

SUMMARY

The present disclosure aims to solve at least one of the technical problems in the existing technology. To this end, the present disclosure provides a data processing method based on secure multi-party computation, an electronic device, and a storage medium, and can improve the efficiency of data processing in a data processing process based on secure multi-party computation.

According to embodiments in a first aspect of the present disclosure, a data processing method based on secure multi-party computation is provided, which is applied to a node server and includes:

obtaining a plurality of pieces of original encrypted data from different data holding terminals;

performing a service parsing process based on the plurality of pieces of the original encrypted data to generate encrypted result data; and sending the encrypted result data to a data reconstruction terminal, so that the data reconstruction terminal performs a reconstructing process to the encrypted result data to obtain service result data.

According to some embodiments of the present disclosure, the plurality of pieces of the original encrypted data include first encrypted data and second encrypted data, and the obtaining a plurality of pieces of original encrypted data from different data holding terminals, includes:

obtaining the first encrypted data $$\begin{pmatrix} s_1^a \\ s_2^a \\ \vdots \\ s_n^a \end{pmatrix} = \begin{pmatrix} 1 & -1 \\ 1 & -\alpha \\ \vdots & \vdots \\ 1 & -\alpha^{n-1} \end{pmatrix} \begin{pmatrix} a_1 \\ a_2 \end{pmatrix}$$

and the second encrypted data $$\begin{pmatrix} s_1^b \\ s_2^b \\ \vdots \\ s_n^b \end{pmatrix} = \begin{pmatrix} 1 & -1 \\ 1 & -\alpha \\ \vdots & \vdots \\ 1 & -\alpha^{n-1} \end{pmatrix} \begin{pmatrix} b_1 \\ b_2 \end{pmatrix},$$

wherein, $$\begin{pmatrix} a_1 \\ a_2 \end{pmatrix}$$

is a second-order confidential vector A, $$\begin{pmatrix} b_1 \\ b_2 \end{pmatrix}$$

is a second-order confidential vector B, $$\begin{pmatrix} 1 & -1 \\ 1 & -\alpha \\ \vdots & \vdots \\ 1 & -\alpha^{n-1} \end{pmatrix}$$

is shared key information, $\alpha$ is a preset shared parameter of the shared key information, wherein the shared key information is a maximum distance separable matrix with linear independent rows.

According to some embodiments of the present disclosure, the performing a service parsing process based on the plurality of pieces of the original encrypted data to generate encrypted result data, includes:

performing the service parsing process to the first encrypted data and the second encrypted data based on a preset service parsing rule to generate the encrypted result data, wherein the service parsing rule is formed by a combination of a vector addition, a vector scalar multiplication or a vector multiplication.

According to some embodiments of the present disclosure, the node server includes n processing nodes $P_1, P_2, \ldots, P_n$, the performing the service parsing process to the first encrypted data and the second encrypted data based on a preset service parsing rule to generate the encrypted result data, includes:

when the service parsing rule is the vector multiplication, generating an intermediate parameter $d_i = s_i^a \cdot s_i^b$ by each processing node $P_i$ according to the first encrypted data and the second encrypted data, wherein the integer $i = 1, 2, \ldots, n$;

sending the intermediate parameter $d_1$ generated by the processing node $P_1$ to the processing node $P_j$, wherein the integer $j \in [3, n]$;

sending the intermediate parameter $d_2$ generated by the processing node $P_2$ to the processing node $P_1$;

sending the intermediate parameter $d_j$ generated by the processing node $P_j$ to the processing node $P_2$;

generating a service encrypted vector $$s_1 = \frac{d_2 - \alpha d_1}{1 - \alpha},$$

in response to the processing node $P_1$ obtaining the intermediate parameter $d_2$;

generating a service encrypted vector $$s_j = \frac{d_j - \alpha^{j-2} d_2}{1 - \alpha^{j-2}},$$

in response to the processing node $P_2$ obtaining the intermediate parameter $d_j$;

generating a service encrypted vector $$s_{j-1} = \frac{d_j - \alpha^j d_1}{1 - \alpha^j},$$

in response to the processing node $P_j$ obtaining the intermediate parameter $d_1$;

generating the encrypted result data $$\begin{pmatrix} s_1 \\ s_2 \\ \vdots \\ s_n \end{pmatrix} = \begin{pmatrix} 1 & -1 \\ 1 & -\alpha^2 \\ \vdots & \vdots \\ 1 & -\alpha^n \end{pmatrix} \begin{pmatrix} a_1 b_1 \\ a_2 b_2 \end{pmatrix},$$

according to each service encrypted vector $s_i$.

According to embodiments in a second aspect of the present disclosure, a data processing method based on secure multi-party computation is provided, which is applied to a data holding terminal and includes:

obtaining original confidential data and shared key information, wherein the shared key information is a maximum distance separable matrix;

performing a first encrypting process to the original confidential data based on the shared key information to generate original encrypted data; and sending the original encrypted data to a node server, so that the node server performs a service parsing process base on the original encrypted data.

According to some embodiments of the present disclosure, the performing a first encrypting process to the original confidential data based on the shared key information to generate original encrypted data, includes:

generating a second-order confidential vector base on the original confidential data; and performing a multiplication matrix operation based on the shared key information and the second-order confidential vector to generate the original encrypted data.

According to embodiments in a third aspect of the present disclosure, a data processing method based on secure multi-party computation is provided, which is applied to a data reconstruction terminal and includes:

obtaining encrypted result data and shared key information, wherein the shared key information is a maximum distance separable matrix with linear independent rows; and performing a reconstructing process to the encrypted result data according to the encrypted result data and the shared key information to obtain service result data.

According to some embodiments of the present disclosure, the performing a reconstructing process to the encrypted result data according to the encrypted result data and the shared key information to obtain service result data, includes:

parsing the encrypted result data to obtain encrypted service result data and an operation number r of vector multiplications corresponding to the encrypted result data;

obtaining a reconstructed matrix $$\begin{pmatrix} 1 & -\alpha^{2^r-1} \\ 1 & -\alpha^{2^r} \\ \vdots & \vdots \\ 1 & -\alpha^{2^r+n-2} \end{pmatrix}$$

based on the operation number r of the vector multiplications and the shared key information; and performing a decrypting process to the encrypted service result data based on the reconstructed matrix to obtain the service result data.

According to embodiments in a fourth aspect of the present disclosure, an electronic device is provided, including: a memory, and a processor, wherein the memory stores a computer program therein which, when executed by the processor, implements the data processing method based on secure multi-party computation as described in any of embodiments in the first aspect, the second aspect or the third aspect.

According to embodiments in a fifth aspect of the present disclosure, a computer readable storage medium is provided, storing a program which, when executed by a processor, implements the data processing method based on secure multi-party computation as described in any of embodiments in the first aspect, the second aspect or the third aspect.

The data processing method based on secure multi-party computation, an electronic device, and a computer storage medium according to the embodiments of the present disclosure, at least have the following beneficial effects.

In the data processing method of the present disclosure, original confidential data and shared key information are firstly obtained from a data holding terminal, wherein the shared key information is a maximum distance separable matrix, and then a first encrypting process is performed to the original confidential data based on the shared key information, to generate original encrypted data, and then the original encrypted data is sent to a node server. Further, the node server obtains a plurality of pieces of the original encrypted data from different data holding terminals, and then performs a service parsing process base on the plurality of pieces of original encrypted data, to generate encrypted result data, and then sends the encrypted result data to a data reconstruction terminal. Furthermore, the data reconstruction terminal obtains the encrypted result data and the shared key information, and then performs a reconstructing process to the encrypted result data according to the encrypted result data and the shared key information, to obtain service result data. In the data processing method based on secure multi-party computation of the present disclosure, the computational resources required for the service parsing process are centrally configured in the node server by means of cooperation of the data holding terminal, the node server and the data reconstruction terminal. Then the shared key information in the form of maximum distance separable matrix is used as the basis for data reconstructing, so as to improve the efficiency of data processing in a data processing process based on secure multi-party computation.

Additional aspects and advantages of the present disclosure will be set forth, in part, in the following description, will become apparent, in part, from the following description, or may be learned by practices of the present disclosure.

BRIEF DESCRIPTION OF THE DRAWINGS

The foregoing and/or additional aspects and advantages of the present disclosure will become apparent and readily understood from the description of the embodiments in conjunction with the following accompanying drawings, wherein.

DETAILED DESCRIPTION

Figure 1:
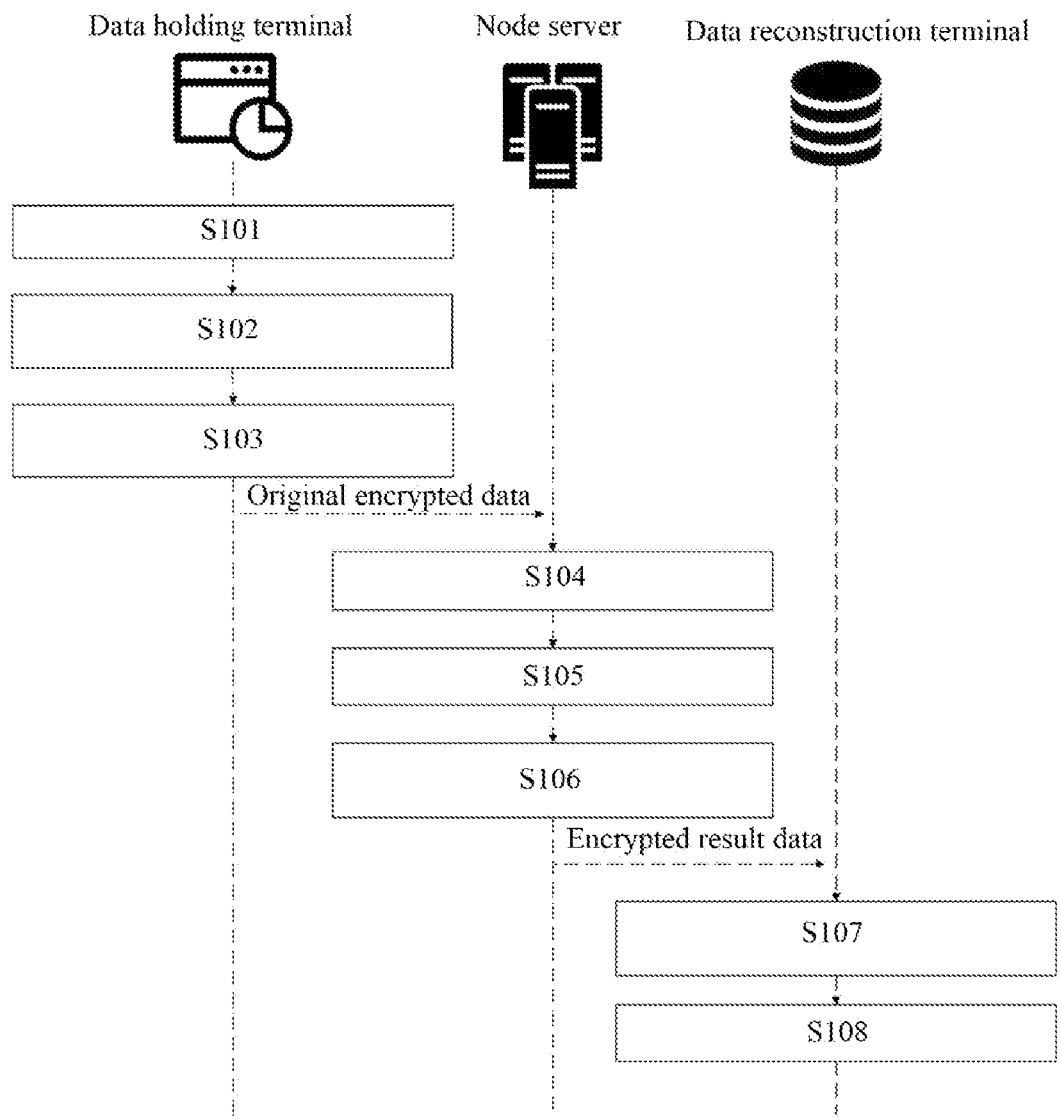
FIG. 1 is a schematic flowchart of a data processing method based on secure multi-party computation according to embodiments of the present disclosure.

Embodiments of the present disclosure are described in detail below, and examples of the embodiments are illustrated in the accompanying drawings, wherein the same or similar reference numerals refer to the same or similar elements or elements having the same or similar functions throughout. The embodiments described below with reference to the accompanying drawings are exemplary, and only used for explaining the present disclosure, and should not be construed as a limitation of the present disclosure.

In the description of the present disclosure, the meaning of "several" is one or more; the meaning of "a plurality of" is two or more; greater than, less than, or more than a number is understood as not including the number; above, below, or within a number is understood as including the number. If the first or the second is described, it is only for the purpose of distinguishing between technical features, it cannot be understood as indicating or implying relative importance, or implicitly specifying the number of the indicated technical features, or implicitly specifying the sequence order of the indicated technical features.

In the description of the present disclosure, it should be understood that the orientations or positional relationships indicated by the terms such as "upper", "lower", "front", "rear", "left", "right" and the like, refer to the orientations or positional relationships shown in the drawings, which are only intended to facilitate describing the disclosure and simplifying the description, and do not indicate or imply that the indicated devices or elements must have a specific orientation, be constructed and operated in a specific orientation, and therefore cannot be understood as a limitation of the disclosure.

In the description of the present specification, the description referring to the terms such as "one embodiment," "some embodiments," "exemplary embodiment," "example," "specific example," or "some examples" means that a particular feature, structure, material, or characteristic described in combination with the embodiment or the example is included in at least one embodiment or example of the present disclosure. In the present specification, schematic representations of the above terms do not necessarily refer to the same embodiment or example. Furthermore, the particular feature, structure, material or characteristic described may be combined in any suitable manner in any one or more embodiments or examples.

In the description of the present disclosure, it should be noted that, unless otherwise clearly defined, terms such as configuration, installation, and connection should be understood in a broad sense, and those of ordinary skills in the art can reasonably determine the specific meanings of the above terms in the present disclosure in combination with the specific content of the technical solution. In addition, the identification of specific steps below does not represent a limitation of the sequence and the execution logic of the steps, and the execution sequence and execution logic of each step should be understood and inferred with reference to the content expressed in the embodiments.

With the development of science and technology, people pay more and more attention to data security. Secure Multi-Party Computation (SMPC) is used to solve the problem that a group of processing nodes distrusting each other respectively hold secret data and collaboratively computes a given function. Secure multi-party computation ensures that the processing nodes can obtain correct computation results while not obtaining any information beyond the computation results. During the entire computing process, each processing node always has absolute control over the data it owns. Secure multi-party computation is actually an aggregation of some cryptographic protocols, mainly including homomorphic encryption, Oblivious Transfer, and Garbled Circuits. The basic operation of the homomorphic encryption is modular exponentiation, which will bring huge computational overhead. After encryption, the ciphertext will be much larger than the plaintext data, which will cause communication overhead. The Oblivious Transfer is based on asymmetric cryptography, which will also have huge computational overhead. The Garbled Circuits will be generated huge network communication information and huge encryption/decryption overhead.

In the related art, secure multi-party computation can be regarded as a cryptographic basis for implementing many applications such as electronic election, threshold signature and electronic auction, and is widely used in the technical field of data processing. However, in most cases, the efficiency of data processing process based on secure multi-party computation is relatively low, because the application of the secure multi-party computation technology is restricted by the communication overhead. Therefore, how to improve the data processing efficiency in the data processing process based on secure multi-party computation has become a major problem to be solved urgently in the industry.

The present disclosure aims to solve at least one of the technical problems in the existing technology. To this end, the present disclosure provides a data processing method based on secure multi-party computation, an electronic device, and a storage medium, which can improve the efficiency of data processing in a data processing process based on secure multi-party computation.

A further description is given below on the basis of the accompanying drawings.

Referring to FIG. 1, in some example embodiments of the present disclosure, various steps of the data processing method based on secure multi-party computation is performed by a data holding terminal, a node server, and a data reconstruction terminal respectively, wherein the data holding terminal performs Step S101 to Step S103, the node server performs Step S104 to Step S106, the data reconstruction terminal performs Step S107 to Step S108. The data holding terminal refers to a terminal holding original confidential data, the node server refers to a terminal providing computation resources and performing a service parsing process, and the data reconstruction terminal refers to a terminal reconstructing encrypted result data into service result data.

Firstly, the design idea of the data processing method based on secure multi-party computation of the present disclosure is clarified as follows.

It should be pointed out that different data holding terminals respectively hold different original confidential data. In some embodiments, in order to meet service requirements, it is necessary to perform a service parsing process based on the original confidential data of different data holding terminals. And in order to ensure the data security of the original confidential data, before the node server performs the service parsing process, it is necessary for different data holding terminals to encrypt their respective original confidential data in advance to obtain their respective original encrypted data. When the node server receives a plurality of pieces of original encrypted data from different data holding terminals, it then uses its own computational resources to centrally perform service parsing process to different original encrypted data so as to obtain encrypted result data, and then sends the encrypted result data to a data reconstruction terminal, so that the data reconstruction terminal performs a reconstructing process to the encrypted result data so as to obtain service result data, and then uses the service result data to meet service requirements. It should be clear that because the shared key information is the basis for different data holding terminals to encrypt their respective original confidential data, the data reconstruction terminal may perform a reconstructing process to the encrypted result data based on the shared key information so as to obtain service result data.

A data processing method based on secure multi-party computation provided by some embodiments of the present disclosure, applied to a data holding terminal, includes:

Step S101, obtaining original confidential data and shared key information, wherein the shared key information is a maximum distance separable matrix;

Step S102, performing a first encrypting process to the original confidential data based on the shared key information to generate original encrypted data; and Step S103, sending the original encrypted data to a node server, so that the node server performs a service parsing process base on the original encrypted data.

A data processing method based on secure multi-party computation provided by some embodiments of the present disclosure, applied to a node server, includes:

Step S104, obtaining a plurality of pieces of original encrypted data from different data holding terminals;

Step S105, performing a service parsing process based on the plurality of pieces of the original encrypted data to generate encrypted result data; and Step S106, sending the encrypted result data to a data reconstruction terminal, so that the data reconstruction terminal performs a reconstructing process to the encrypted result data to obtain service result data.

A data processing method based on secure multi-party computation provided by some embodiments of the present disclosure, applied to a data reconstruction terminal, includes:

Step S107, obtaining encrypted result data and shared key information, wherein the shared key information is a maximum distance separable matrix with linear independent rows; and Step S108, performing a reconstructing process to the encrypted result data according to the encrypted result data and the shared key information to obtain service result data.

It should be noted that, in the data processing method of the present disclosure, original confidential data and shared key information are firstly obtained from a data holding terminal, wherein the shared key information is a maximum distance separable matrix, and then a first encrypting process is performed to the original confidential data based on the shared key information, to generate original encrypted data, and then the original encrypted data is sent to a node server. Further, the node server obtains a plurality of pieces of the original encrypted data from different data holding terminals, and then performs a service parsing process base on the plurality of pieces of original encrypted data, to generate encrypted result data, and then sends the encrypted result data to a data reconstruction terminal. Furthermore, the data reconstruction terminal obtains the encrypted result data and the shared key information, and then performs a reconstructing process to the encrypted result data according to the encrypted result data and the shared key information, to obtain service result data. In the data processing method based on secure multi-party computation of the present disclosure, the computational resources required for the service parsing process are centrally configured in the node server by means of cooperation of the data holding terminal, the node server and the data reconstruction terminal. Then the shared key information in the form of maximum distance separable matrix is used as the basis for data reconstructing, so as to improve the efficiency of data processing in a data processing process based on secure multi-party computation.

According to Step S101 to Step S103 performed by the data holding terminal in some embodiments of the present disclosure, obtaining original confidential data and shared key information, wherein the shared key information is a maximum distance separable matrix, and then performing a first encrypting process to the original confidential data based on the shared key information to generate original encrypted data; sending the original encrypted data to a node server, so that the node server performs a service parsing process base on the original encrypted data. It should be noted that, the data holding terminal refers to a terminal holding original confidential data, the original confidential data refers to the confidential data exclusive to each data holding terminal. In some embodiments, original confidential data possesses a relatively high value to the data holding terminal, so the data holding terminal pays more attention to the data security of the original confidential data. However, in order to meet some special service requirements (such as joint credit), it is necessary for multiple data holding terminals to provide their own original confidential data, and then to perform service parsing process based on each original confidential data so as to obtain corresponding service result data to meet service requirements.

In order to ensure the security of the original confidential data while meeting the service requirements, prior to performing the service parsing process based on each original confidential data, in some exemplary embodiments of the present disclosure, it is necessary for the data holding terminal to perform a first encrypting process in advance to the original confidential data based on the shared key information. It should be understood that the shared key information refers to the key information shared by the data holding terminal and the data reconstruction terminal. It should be understood that the shared key information is the basis for different data holding terminals to encrypt their original confidential data, therefore, the data reconstruction terminal can perform a reconstructing process to the encrypted result data based on the shared key information so as to obtain the service result data. In some embodiments of the present disclosure, the shared key information is specifically a Maximum Distance Separable (MDS) matrix. It should be clarified that the maximum distance separable matrix refers to a matrix in which any two rows are linearly independent. Because any two rows are linearly independent, in the service parsing process of the plurality of pieces of the original encrypted data, it can be ensured that the decryption method corresponding to the original encrypted data does not change with performing of the service parsing process. It can be ensured that the data reconstruction terminal can perform the reconstructing process to the encrypted result data according to the encrypted result data and the shared key information, so as to obtain the service result data to meet the service requirements. It should be further clarified that the node server does not obtain the shared key information, therefore, the node server cannot restore the original confidential data from the original encrypted data. In addition, because the encrypted result data is obtained from each original encrypted data after the service parsing process, after the data reconstruction terminal obtains the encrypted result data, it can only reconstruct the encrypted result data based on the shared key information so as to obtain the service result data, but cannot obtain the original confidential data of each data holding terminal by parsing from the encrypted result data.

Figure 2:
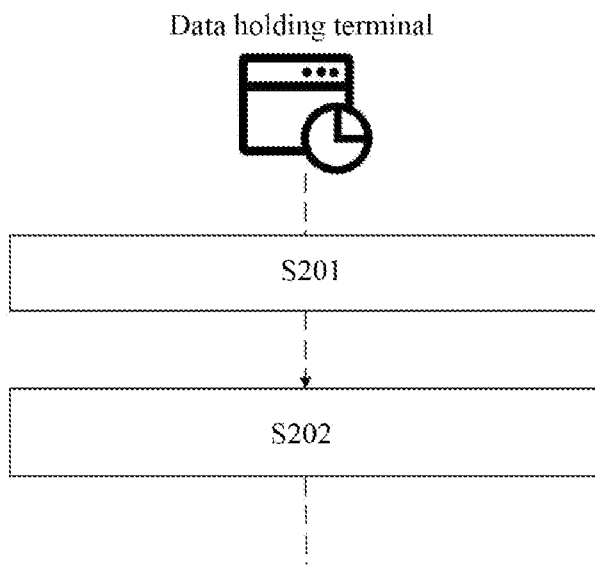
FIG. 2 is another schematic flowchart of the data processing method based on secure multi-party computation according to embodiments of the present disclosure.

Referring to FIG. 2, according to some embodiments of the present disclosure, the Step S102 of performing a first encrypting process to the original confidential data based on the shared key information to generate original encrypted data, includes:

Step S201, generating a second-order confidential vector base on the original confidential data;

Step S202, performing a multiplication matrix operation based on the shared key information and the second-order confidential vector to generate the original encrypted data.

According to Step S201 to Step S202 in some embodiments of the present disclosure, firstly generating a second-order confidential vector base on the original confidential data, and then performing a multiplication matrix operation based on the shared key information and the second-order confidential vector to generate the original encrypted data. It should be emphasized that the shared key information is specifically a maximum distance separable matrix. It is to be clarified that the maximum distance separable matrix refers to a matrix in which any two rows in the matrix are linearly independent. Therefore, in the service parsing process to the plurality of the original encrypted data, it can be ensured that the decryption method corresponding to the original encrypted data does not change with performing of the service parsing process. It is further ensured that the data reconstruction terminal can perform the reconstructing process to the encrypted result data according to the encrypted data and the shared key information so as to obtain service result data to meet service requirements. It is to be further clarified that since the node server does not obtain the shared key information, the node server cannot restore the original confidential data from the original encrypted data. In addition, because the encrypted result data is obtained from each original encrypted data after the service parsing process, after the data reconstruction terminal obtains the encrypted result data, it can only reconstruct the encrypted result data based on the shared key information so as to obtain the service result data, but cannot obtain the original confidential data of each data holding terminal by parsing from the encrypted result data. It should be pointed out that the maximum distance separable matrix which can be used as the shared key information may be $$\begin{pmatrix} 1 & -1 \\ 1 & -\alpha \\ \vdots & \vdots \\ 1 & -\alpha^{n-1} \end{pmatrix},$$

also may be $$\begin{pmatrix} 1 & -\alpha^{e+f} \\ 1 & -\alpha^{e+2f} \\ \vdots & \vdots \\ 1 & -\alpha^{e+nf} \end{pmatrix},$$

further may be $$\begin{pmatrix} 1 & \alpha^{e+f} \\ 1 & \alpha^{e+2f} \\ \vdots & \vdots \\ 1 & \alpha^{e+nf} \end{pmatrix}$$

or other types of maximum distance separable matrices, wherein $\alpha$ is a preset shared parameter of the shared key information. It should be understood that the preset shared parameter $\alpha$ may be a primitive element in a finite field corresponding to the original encrypted data. In some more specific embodiments, if a finite field $F_q$ is given, the preset shared parameter $\alpha$ is a primitive element in the infinite field $F_q$ corresponding to the original encrypted data, wherein $|q| \geq n+1$, $\alpha^m \neq 1$, $m = 1, 2, \ldots, n-2$.

In some more specific embodiments of the present disclosure, according to the original confidential data held by each of the different data holding terminals, a plurality of pieces of different second-order confidential vectors such as a second-order confidential vector $$A = \begin{pmatrix} a_1 \\ a_2 \end{pmatrix},$$

a second-order confidential vector $$B = \begin{pmatrix} b_1 \\ b_2 \end{pmatrix}$$

may be generated. Take the second-order confidential vector $$A = \begin{pmatrix} a_1 \\ a_2 \end{pmatrix},$$

and the second-order confidential vector $$B = \begin{pmatrix} b_1 \\ b_2 \end{pmatrix}$$

as an example, the shared key information is determined as a maximum distance separable matrix $$\begin{pmatrix} 1 & -1 \\ 1 & -\alpha \\ \vdots & \vdots \\ 1 & -\alpha^{n-1} \end{pmatrix},$$

therefore, a multiplication matrix operation is performed based on the shared key information and the second-order confidential vector to generate original encrypted data. The first encrypted data $$\begin{pmatrix} s_1^a \\ s_2^a \\ \vdots \\ s_n^a \end{pmatrix}$$

may be obtained, $$\begin{pmatrix} s_1^a \\ s_2^a \\ \vdots \\ s_n^a \end{pmatrix} = \begin{pmatrix} 1 & -1 \\ 1 & -\alpha \\ \vdots & \vdots \\ 1 & -\alpha^{n-1} \end{pmatrix} \begin{pmatrix} a_1 \\ a_2 \end{pmatrix},$$

and the second encrypted data $$\begin{pmatrix} s_1^b \\ s_2^b \\ \vdots \\ s_n^b \end{pmatrix}$$

may be obtained, $$\begin{pmatrix} s_1^b \\ s_2^b \\ \vdots \\ s_n^b \end{pmatrix} = \begin{pmatrix} 1 & -1 \\ 1 & -\alpha \\ \vdots & \vdots \\ 1 & -\alpha^{n-1} \end{pmatrix} \begin{pmatrix} b_1 \\ b_2 \end{pmatrix}.$$

It should be understood that, based on different maximum distance separable matrices, the shared key information may be used to encrypt the original confidential data in different ways which can include, but are not limited to, the specific embodiments listed above.

According to Step S104 to Step S106 performed by the node sever in some embodiments of the present disclosure, firstly obtaining a plurality of pieces of original encrypted data from different data holding terminals, and then performing a service parsing process, so as to generate encrypted result data based on the plurality of pieces of original encrypted data, and sending the encrypted result data to a data reconstruction terminal, so that the data reconstruction terminal performs a reconstructing process to the encrypted result data to obtain service result data. It should be noted that, the node server refers to a terminal providing computation resources for performing a service parsing process, and the encrypted result data is encrypted result data obtained by performing the service parsing process based on the plurality of pieces of original encrypted data. It should be understood that encrypted result data refers to the service result data after encryption, and the service result data is used to meet the service requirements. It should be understood that there are various types of service requirements, which may include but are not limited to a series of tasks such as cluster classification, qualification determination, and intelligent screening. Therefore, according to different service requirements, their corresponding service parsing processes will also be different. However, according to some embodiments provided by the present disclosure, the service parsing process may be regarded as performing operations according to the corresponding preset service parsing rules based on the plurality of pieces of original encrypted data. In some more specific embodiments of the present disclosure, the service parsing rule is formed by a combination of a vector addition, a vector scalar multiplication or a vector multiplication.

According to some embodiments of the present disclosure, a plurality of pieces of original encrypted data include first encrypted data and second encrypted data, the Step S104 of obtaining a plurality of pieces of original encrypted date from different data holding terminals, includes:

obtaining the first encrypted data $$\begin{pmatrix} s_1^a \\ s_2^a \\ \vdots \\ s_n^a \end{pmatrix} = \begin{pmatrix} 1 & -1 \\ 1 & -\alpha \\ \vdots & \vdots \\ 1 & -\alpha^{n-1} \end{pmatrix} \begin{pmatrix} a_1 \\ a_2 \end{pmatrix}$$

and the second encrypted data $$\begin{pmatrix} s_1^b \\ s_2^b \\ \vdots \\ s_n^b \end{pmatrix} = \begin{pmatrix} 1 & -1 \\ 1 & -\alpha \\ \vdots & \vdots \\ 1 & -\alpha^{n-1} \end{pmatrix} \begin{pmatrix} b_1 \\ b_2 \end{pmatrix},$$

wherein, $$\begin{pmatrix} a_1 \\ a_2 \end{pmatrix}$$

is a second-order confidential vector $$A, \begin{pmatrix} b_1 \\ b_2 \end{pmatrix}$$

is a second-order confidential vector $$B, \begin{pmatrix} 1 & -1 \\ 1 & -\alpha \\ \vdots & \vdots \\ 1 & -\alpha^{n-1} \end{pmatrix}$$

is shared key information, wherein the shared key information is a maximum distance separable matrix with linear independent rows.

Figure 3:
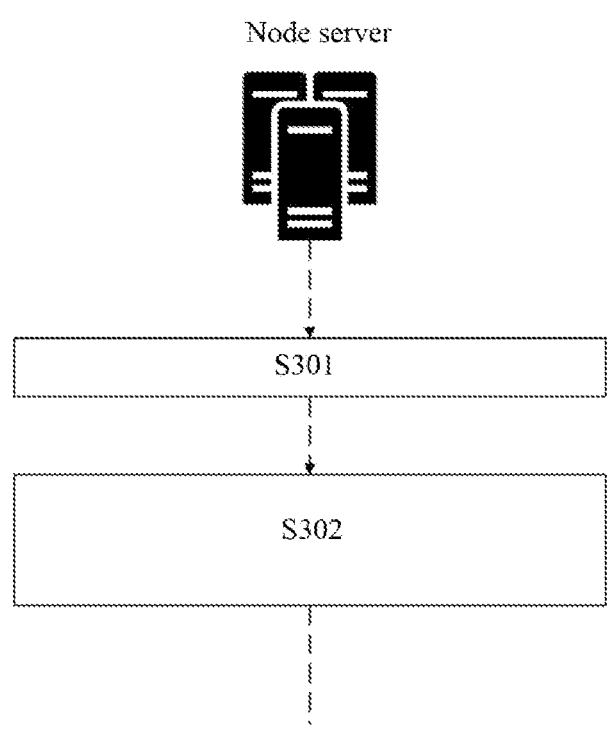
FIG. 3 is another schematic flowchart of the data processing method based on secure multi-party computation according to embodiments of the present disclosure.

Referring to FIG. 3, according to some embodiments of the present disclosure, the Step S105 of performing a service parsing process based on the plurality of pieces of the original encrypted data to generate encrypted result data, includes:

Step S301, obtaining a preset service parsing rule;

Step S302, performing the service parsing process to the first encrypted data and the second encrypted data based on the preset service parsing rule to generate encrypted result data, wherein the service parsing rule is formed by a combination of a vector addition, a vector scalar multiplication or a vector multiplication.

According to Step S301 to Step S302 in some embodiments of the present disclosure, firstly obtaining a preset service parsing rule, and then performing the service parsing process to the first encrypted data and the second encrypted data based on the preset service parsing rule to generate encrypted result data, wherein the service parsing rule is formed by a combination of a vector addition, a vector scalar multiplication or a vector multiplication. It should be noted that, service parsing rule refers to a preset rule for performing the service parsing process based on original confidential data so as to generate the service result data. It is to be clarified that the node server obtains the original confidential data after encryption, that is, the original encrypted data. Therefore, the data obtained from parsing the original encrypted data with the service parsing rule is the service result data after encryption, that is, the encrypted result data. It should be understood that there are various types of service requirements, which may include but are not limited to a series of tasks such as cluster classification, qualification determination, and intelligent screening. Therefore, according to different service requirements, their corresponding service parsing processes will also be different. However, according to some embodiments provided by the present disclosure, the service parsing process can be regarded as performing operations according to the corresponding preset service parsing rules based on the plurality of pieces of original encrypted data. In some more specific embodiments of the present disclosure, the service parsing rule is formed by a combination of a vector addition, a vector scalar multiplication or a vector multiplication. It should be noted that the shared key information is specifically a maximum distance separable matrix, and the maximum distance separable matrix refers to a matrix in which any two rows in the matrix are linearly independent. Therefore, in the service parsing process to the plurality of the original encrypted data, it can be ensured that the decryption method corresponding to the original encrypted data does not change with performing of the service parsing process. It is further ensured that the data reconstruction terminal can perform the reconstructing process to the encrypted result data according to the encrypted data and the shared key information so as to obtain service result data to meet service requirements.

Figure 4:
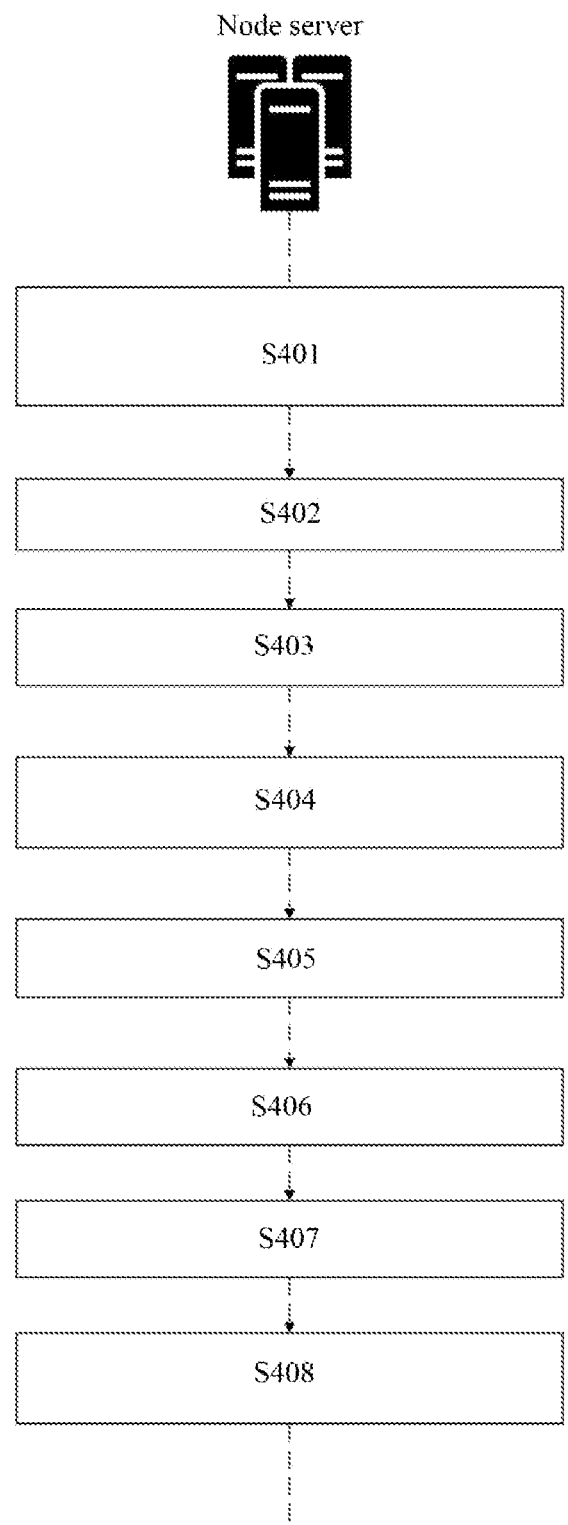
FIG. 4 is another schematic flowchart of the data processing method based on secure multi-party computation according to embodiments of the present disclosure.

Referring to FIG. 4, according to some embodiments of the present disclosure, the node server includes n processing nodes $P_1, P_2, \ldots, P_n$, the step of performing the service parsing process to the first encrypted data and the second encrypted data based on the preset service parsing rule to generate the encrypted result data, includes:

Step S401, when the service parsing rule is the vector multiplication, generating an intermediate parameter $d_i = s_i^a \cdot s_i^b$ by each processing node $P_i$ according to the first encrypted data and the second encrypted data, wherein the integer $i = 1, 2, \ldots, n$;

Step S402, sending the intermediate parameter $d_1$ generated by the processing node $P_1$ to the processing node $P_j$, wherein the integer $j \in [3, n]$;

Step S403, sending the intermediate parameter $d_2$ generated by the processing node $P_2$ to the processing node $P_1$;

Step S404, sending the intermediate parameter $d_j$ generated by the processing node $P_j$ to the processing node $P_2$;

Step S405, generating a service encrypted vector $$s_1 = \frac{d_2 - \alpha d_1}{1 - \alpha},$$

in response to the processing node $P_1$ obtaining the intermediate parameter $d_2$;

Step S406, generating a service encrypted vector $$s_j = \frac{d_j - \alpha^{j-2} d_2}{1 - \alpha^{j-2}},$$

in response to the processing node $P_2$ obtaining the intermediate parameter $d_j$;

Step S407, generating a service encrypted vector $$s_{j-1} = \frac{d_j - \alpha^j d_1}{1 - \alpha^j},$$

in response to the processing node $P_j$ obtaining the intermediate parameter $d_1$;

Step S408, generating the encrypted result data $$\begin{pmatrix} s_1 \\ s_2 \\ \vdots \\ s_n \end{pmatrix} = \begin{pmatrix} 1 & -\alpha \\ 1 & -\alpha^2 \\ \vdots & \vdots \\ 1 & -\alpha^n \end{pmatrix} \begin{pmatrix} a_1 b_1 \\ a_2 b_2 \end{pmatrix},$$

according to each service encrypted vector $s_i$.

According to some embodiments of the present disclosure, the service parsing rule is formed by a combination of a vector addition, a vector scalar multiplication or a vector multiplication. it should be noted that, in the vector addition, each processing node $P_i$ performs a local computation $s_i^a + s_i^b$ at the processing node, as the respective original encrypted data. It is to be noted that the vector addition will not change the maximum distance separable matrix, so in the process of addition, there is no information interaction between the processing nodes, therefore, no communication overhead will be generated. In addition, in the vector multiplication, each processing node $P_i$ performs a local computation $c \cdot s_i^a$ (c is a constant) at the processing node, as the respective original encrypted data. It is to be noted that scalar multiplication operation will not change the maximum distance separable matrix either. Similarly, in the process of multiplication, there is no information interaction between the processing nodes, so no communication overhead will be generated. However, the vector multiplication operation requires information interaction between different processing nodes, resulting in main communication overhead in the node server. It should be noted that the mainstream secure multi-party computation protocols are divided into three categories: Yao's Garbled Circuit (GC), GMW protocol and BGW protocol. The GC and the GMW protocol are mainly based on Oblivious Transfer (OT) technology, homomorphic encryption, Beaver method, etc. The BGW protocol also support a secure multi-party computation protocol. The BGW protocol is based on Shamir(t, n) threshold secret sharing mechanism, and uses properties of additive homomorphisms and multiplicative homomorphisms for Shamir secret sharing mechanism. It should be pointed out that when the number of processing nodes involved in the operation is relatively huge, a huge communication overhead will be generated. This is the general problem of the current mainstream secure multi-party computation methods. Communication complexities of multiplications in the general MPC protocol including garbled circuits, GMW protocol are both $O(n^2)$. In the above-mentioned BGW protocol, both the addition and the scalar multiplication are performed locally at the processing node, and no message interaction is required, so all communication overhead occurs in the multiplication operation. Therefore, in order to reduce the communication overhead generated by the secure multi-party computation, in Step S401 to Step S408 shown in some preferred embodiments of the present disclosure, the vector multiplication only requires a specific processing node to send a finite field symbol to another processing node, and the communication complexity is $O(n)$, so that the communication overhead is greatly reduced. It should be emphasized that, in the embodiments of the present disclosure, the content for performing data interaction between the processing nodes of the node server may include, but is not limited to, the finite field symbols listed above.

According to some more specific embodiments of the present disclosure, in the step of performing the service parsing process to the first encrypted data and the second encrypted data based on the preset service parsing rule to generate the encrypted result data, the vector multiplication may include:

Step S501, firstly locally computing by each processing node $P_i$ an intermediate parameter $$d_i = s_i^a \cdot s_i^b,$$

wherein the integer i=1, 2, . . . , n;

In some embodiments, the intermediate parameter $$d_i = s_i^a \cdot s_i^b = (a_1 - \alpha^{i-1} a_2)(b_1 - \alpha^{i-1} b_2) = a_1 a_2 + \alpha^{2(i-1)} a_2 b_2 - \alpha^{i-1}(a_1 b_2 + a_2 b_1)$$

according to Step S501;

Step S502, sending by the processing node $P_1$ the intermediate parameter $d_1$ to the processing nodes $P_3$, $P_4$, . . . , $P_j$, wherein the integer $j \in [3, n]$, sending by the processing node $P_2$ the intermediate parameter $d_2$ to the processing node $P_1$, and sending by the processing node $P_j$ the intermediate parameter $d_j$ to the processing node $P_2$;

Step S503, locally computing by the processing node $P_1$ the service encrypted vector $$s_1 = \frac{d_2 - \alpha d_1}{1 - \alpha},$$

locally computing by the processing node $P_2$ the service encrypted vector $$s_j = \frac{d_j - \alpha^{j-2} d_2}{1 - \alpha^{j-2}},$$

locally commuting by the processing node $P_j$ ($3 \leq j \leq n$) the service encrypted vector $$s_{j-1} = \frac{d_j - \alpha^j d_1}{1 - \alpha^j}$$

to generate encrypted result data $$\begin{pmatrix} s_1 \\ s_2 \\ \vdots \\ s_n \end{pmatrix} = \begin{pmatrix} 1 & -\alpha \\ 1 & -\alpha^2 \\ \vdots & \vdots \\ 1 & -\alpha^n \end{pmatrix} \begin{pmatrix} a_1 b_1 \\ a_2 b_2 \end{pmatrix}$$

according to each service encrypted vector $s_i$.

In some embodiments, it could be obtained from Step S503, $$s_1 = \frac{d_2 - \alpha d_1}{1 - \alpha} = a_1 b_1 - \alpha a_2 b_2, \; s_j = \frac{d_j - \alpha^{j-2} d_2}{1 - \alpha^{j-2}} = a_1 b_1 - \alpha^j a_2 b_2,$$

$$s_{j-1} = \frac{d_j - \alpha^j d_1}{1 - \alpha^j} = a_1 b_1 - \alpha^{j-1} a_2 b_2.$$

Further, the above results could be written into a matrix form of the encrypted result data:

$$\begin{pmatrix} s_1 \\ s_2 \\ \vdots \\ s_n \end{pmatrix} = \begin{pmatrix} 1 & -\alpha \\ 1 & -\alpha^2 \\ \vdots & \vdots \\ 1 & -\alpha^n \end{pmatrix} \begin{pmatrix} a_1 b_1 \\ a_2 b_2 \end{pmatrix}.$$

It may be clarified according to the above equation that, $s_1, s_2, \ldots, s_n$ is a service encrypted vector generated by $(a_1b_1, a_2b_2)$ secret sharing, the corresponding shared key information is:

$$\begin{pmatrix} 1 & -\alpha \\ 1 & -\alpha^2 \\ \vdots & \vdots \\ 1 & -\alpha^n \end{pmatrix}.$$

In the above operations, the processing node $P_i$ has a service encrypted vector $s_i$, the processing node $P_2$ has a service encrypted vector $S_j$, and other processing node $P_j$ has a service encrypted vector $s_{j-1}$. It should be understood that, in the next round of computation, the service encrypted vector $S_j$ is a portion of a computation of the processing node $P_j$. In the actual implementation, it can be done by a role replacement method, that is, the role of $P_1$ in the next round of computation remains $P_1$, the role of $P_2$ in the next round of computation is $P_j$, and the role of $P_j$ in the next round of computation is $P_{j-1}$. The order of the role replacement is public. And the processing nodes do not need to do any computations. It is only necessary to remember the role of each processing node in the next round. After each round of multiplication operation, the encrypted result data is $$\begin{pmatrix} s_1 \\ s_2 \\ \vdots \\ s_n \end{pmatrix} = \begin{pmatrix} 1 & -\alpha \\ 1 & -\alpha^2 \\ \vdots & \vdots \\ 1 & -\alpha^n \end{pmatrix} \begin{pmatrix} a_1b_1 \\ a_2b_2 \end{pmatrix}.$$

Therefore, after r rounds of multiplication operations, the corresponding shared key information can be updated as $$\begin{pmatrix} 1 & -\alpha^{2^r-1} \\ 1 & -\alpha^{2^r} \\ \vdots & \vdots \\ 1 & -\alpha^{2^r+n-2} \end{pmatrix}.$$

It is clarified that as long as the node server records the rounds of multiplication operations performed in the service parsing process, and includes the rounds into the encrypted result data, and then sends the encrypted result data to the data reconstruction terminal, the data reconstruction terminal can obtain an update of the shared key information, based on knowing the shared key information before it is updated, so that the data reconstruction terminal can perform a reconstructing process to the encrypted result data according to the encrypted result data and the shared key information to obtain the service result data.

According to Step S107 to Step S108 performed by the data reconstruction terminal in some embodiments of the present disclosure, firstly obtaining encrypted result data and shared key information, wherein the shared key information is a maximum distance separable matrix with linear independent rows, and then performing a reconstructing process to the encrypted result data according to the encrypted result data and the shared key information to obtain service result data. it should be noted that, the data reconstruction terminal refers to a terminal reconstructing encrypted result data into service result data, the encrypted result data refers to the service result data after encryption, and the service result data are used for meeting service requirements. It should be understood that there are various types of service requirements, which may include but are not limited to a series of tasks such as cluster classification, qualification determination, and intelligent screening. In order to ensure the security of the original confidential data while meeting the service requirements, prior to performing the service parsing process based on each original confidential data, in some exemplary embodiments of the present disclosure, it is necessary for the data holding terminal to perform a first encrypting process in advance to the original confidential data based on the shared key information; and a reconstructing process is performed to the encrypted result data according to the encrypted result data and the shared key information after performing service parsing process to the original encrypted data. It is to be noted that the shared key information refers to the key information shared by the data holding terminal and the data reconstruction terminal. It should be understood that the shared key information is the basis for different data holding terminals to encrypt their original confidential data, therefore, the data reconstruction terminal may perform a reconstructing process to the encrypted result data based on the shared key information so as to obtain the service result data. In some embodiments of the present disclosure, the shared key information is specifically a Maximum Distance Separable (MDS) matrix. It should be emphasized that the maximum distance separable matrix refers to a matrix in which any two rows are linearly independent. Because any two rows are linearly independent, in the service parsing process to the plurality of the original encrypted data, it can be ensured that the decryption method corresponding to the original encrypted data does not change with performing of the service parsing process. It can be also ensured that the data reconstruction terminal can perform the reconstructing process to the encrypted result data according to the encrypted result data and the shared key information, so as to obtain the service result data to meet the service requirements. It should be further clarified that the node server does not obtain the shared key information, therefore, the node server cannot restore the original confidential data from the original encrypted data. In addition, the encrypted result data is obtained from each original encrypted data after the service parsing process, therefore, after the data reconstruction terminal obtains the encrypted result data, it can only reconstruct the encrypted result data based on the shared key information so as to obtain the service result data, but cannot obtain the original confidential data of each data holding terminal by parsing from the encrypted result data.

Figure 6:
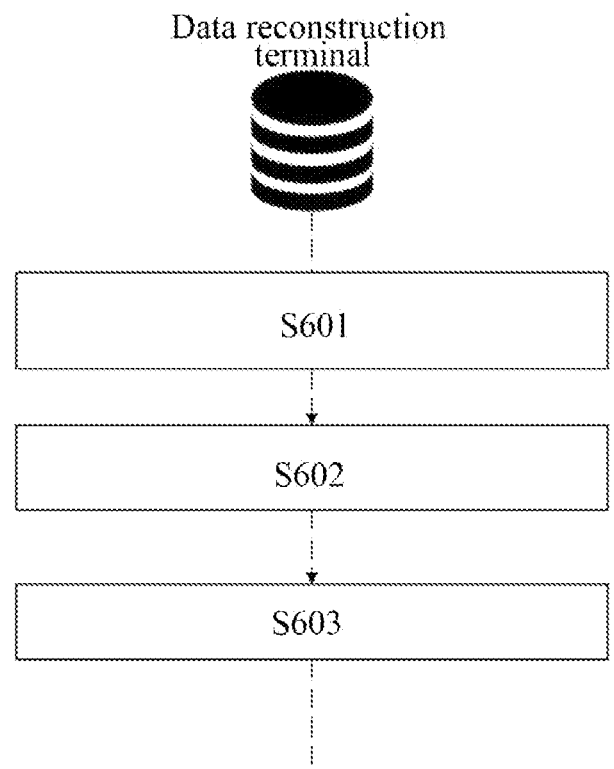
FIG. 6 is another schematic flowchart of the data processing method based on secure multi-party computation according to embodiments of the present disclosure.

Referring to FIG. 6, according to some embodiments of the present disclosure, the Step S108 of performing a reconstructing process to the encrypted result data according to the encrypted result data and the shared key information to obtain service result data, includes:

Step S601, parsing the encrypted result data to obtain the encrypted service result data and an operation number r of vector multiplications corresponding to the encrypted result data;

Step S602, obtaining a reconstructed matrix $$\begin{pmatrix} 1 & -\alpha^{2^r-1} \\ 1 & -\alpha^{2^r} \\ \vdots & \vdots \\ 1 & -\alpha^{2^r+n-2} \end{pmatrix}$$

based on the operation number r of the vector multiplications and the shared key information; and Step S603, performing a decrypting process to the encrypted service result data based on the reconstructed matrix to obtain the service result data.

In Step S601 to Step S603 of some embodiments of the present disclosure, after each round of multiplication operations, the encrypted result data is $$\begin{pmatrix} s_1 \\ s_2 \\ \vdots \\ s_n \end{pmatrix} = \begin{pmatrix} 1 & -\alpha \\ 1 & -\alpha^2 \\ \vdots & \vdots \\ 1 & -\alpha^n \end{pmatrix} \begin{pmatrix} a_1 b_1 \\ a_2 b_2 \end{pmatrix},$$

therefore after r rounds of multiplication operations, the corresponding shared key information can be updated as $$\begin{pmatrix} 1 & -\alpha^{2^r-1} \\ 1 & -\alpha^{2^r} \\ \vdots & \vdots \\ 1 & -\alpha^{2^r+n-2} \end{pmatrix}.$$

Therefore, it may be clarified that, as long as the node server records the rounds of multiplication operations performed in the service parsing process, and includes the rounds into the encrypted result data, and then sends the encrypted result data to the data reconstruction terminal, the data reconstruction terminal can obtain an update of the shared key information, based on knowing the shared key information before it is updated, so that the data reconstruction terminal may perform a reconstructing process to the encrypted result data according to the encrypted result data and the shared key information to obtain the service result data. For example, when the data reconstruction terminal obtains the shared key information $$\begin{pmatrix} 1 & -\alpha \\ 1 & -\alpha^2 \\ \vdots & \vdots \\ 1 & -\alpha^n \end{pmatrix}$$

before updating, and obtains the encrypted result data $$\begin{pmatrix} s_1 \\ s_2 \\ \vdots \\ s_n \end{pmatrix} = \begin{pmatrix} 1 & -\alpha \\ 1 & -\alpha^2 \\ \vdots & \vdots \\ 1 & -\alpha^n \end{pmatrix} \begin{pmatrix} a_1 b_1 \\ a_2 b_2 \end{pmatrix}$$

and an operation number r of the vector multiplication operations from the encrypted result data, $$\begin{pmatrix} 1 & -\alpha^{2^r-1} \\ 1 & -\alpha^{2^r} \\ \vdots & \vdots \\ 1 & -\alpha^{2^r+n-2} \end{pmatrix},$$

that is, the reconstructed matrix after updating can be obtained by further computation. Furthermore, a decrypting process is performed to the encrypted service result data based on the reconstructed matrix $$\begin{pmatrix} 1 & -\alpha^{2^r-1} \\ 1 & -\alpha^{2^r} \\ \vdots & \vdots \\ 1 & -\alpha^{2^r+n-2} \end{pmatrix}$$

to obtain service result data.

It should be emphasized that, in order to reduce the communication overhead generated by the secure multi-party computation, in some exemplary embodiments of the present disclosure, the service parsing process performed to the first encrypted data and the second encrypted data based on the preset service parsing rule in the node server of the present disclosure, so as to generate encrypted result data, and vector multiplications which require communication overhead, only require a specific processing node to send a piece of interactive data to another processing node, so that the communication complexity is reduced, and the communication overhead is also reduced accordingly.

Figure 7:
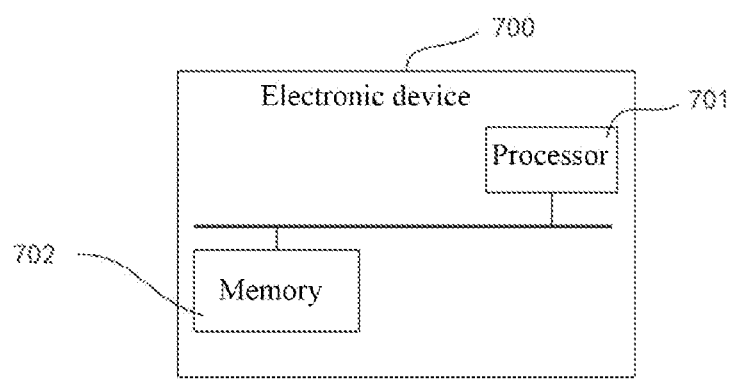
FIG. 7 is a schematic diagram of the hardware structure of the electronic device provided by the embodiments of the present disclosure.

FIG. 7 illustrates an electronic device 700 provided by the embodiments of the present disclosure. The electronic device 700 includes a processor 701, a memory 702, and a computer program stored in the memory 702 and executable in the processor 701, wherein the computer program, when being executed, is used for performing the foregoing data processing method based on secure multi-party computation.

The processor 701 and the memory 702 may be connected by a bus or other means.

As a non-transitory computer-readable storage medium, the memory 702 can be used to store non-transitory software programs and non-transitory computer-executable programs, such as the data processing method based on secure multi-party computation described in the embodiments of the present disclosure. The processor 701 implements the above-mentioned data processing method based on secure multi-party computation by running the non-transitory software programs and instructions stored in the memory 702.

The memory 702 may include a program storage area and a data storage area, wherein the program storage area may store an operating system, an application program required for at least one function. The data storage area may store programs for performing the above-mentioned data processing method based on secure multi-party computation. Additionally, the memory 702 may include a high-speed random access memory 702, and may also include a non-transitory memory 702, such as at least one storage component, flash memory component, or other non-transitory solid-state storage component. In some embodiments, the memory 702 may optionally include remote memories 702 located remotely from the processor 701, and these remote memories 702 may be connected to the electronic device 700 via a network. Examples of such networks include, but are not limited to, the Internet, intranet, local area network, mobile communication network, or combinations thereof.

The non-transitory software programs and instructions required for implementing the above-mentioned data processing method based on secure multi-party computation are stored in the memory 702. When they are executed by one or more processors 701, the above-mentioned data processing method based on secure multi-party computation is performed. For example, step S101 to step S108 of the method in FIG. 1, step S201 to step S202 of the method in FIG. 2, step S301 to step S302 of the method in FIG. 3, step S401 to step S408 of the method in FIG. 4, step S501 to step S503 of the method in FIG. 5, and step S601 to step S603 of the method in FIG. 6 are performed.

The embodiments of the present disclosure further provide a computer readable storage medium storing computer-executable instructions for performing the above-mentioned data processing method based on secure multi-party computation.

Figure 5:
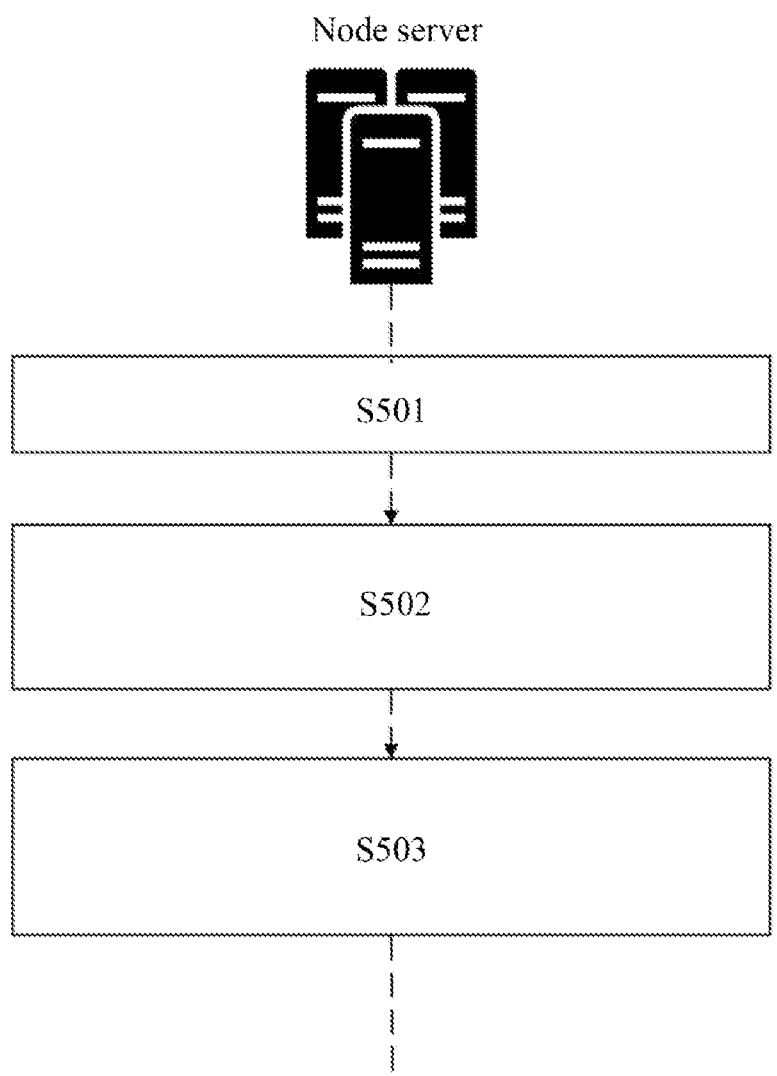
FIG. 5 is another schematic flowchart of the data processing method based on secure multi-party computation according to embodiments of the present disclosure.

In an embodiment, the computer-readable storage medium stores computer-executable instructions that are executed by one or more control processors, for example, to perform step S101 to step S108 of the method in FIG. 1, step S201 to step S202 of the method in FIG. 2, step S301 to step S302 of the method in FIG. 3, step S401 to step S408 of the method in FIG. 4, step S501 to step S503 of the method in FIG. 5, and step S601 to step S603 of the method in FIG. 6.

The apparatus embodiments described above are only illustrative, wherein the units described as separate components may or may not be physically separated, that is, they may be located in one place, or may be distributed over multiple network units. Some or all of the modules may be selected according to actual needs so as to achieve the purpose of the solution in this embodiment.

Those of ordinary skills in the art can understand that all or some of the steps in the methods, and systems disclosed above can be implemented as a software, a firmware, a hardware, or appropriate combinations thereof. Some or all physical components may be implemented as a software executed by a processor, such as a central processing unit, digital signal processor or microprocessor, or as a hardware, or as an integrated circuit, such as an application specific integrated circuit. Such software may be distributed over computer-readable media, which may include computer storage media (or non-transitory media) and communication media (or transitory media). As is known to those of ordinary skills in the art, the term "computer storage medium" includes volatile medium or nonvolatile medium, removable medium or non-removable medium, implemented in any method or technology for storing information such as computer readable instructions, data structures, program modules or other data. Computer storage medium includes, but is not limited to, RAM, ROM, EEPROM, flash memory or other memory technology, CD-ROM, digital versatile disk (DVD) or other optical disk storage, magnetic cartridges, magnetic tape, storage device or other magnetic storage devices, or any other medium that can be used to store desired information and that can be accessed by a computer. In addition, it is well known to those of ordinary skills in the art that communication media typically include computer readable instructions, data structures, program modules, or other data in a modulated data signal such as a carrier wave or other transmitting mechanism, and can include any information delivery media. It should also be understood that various implementations provided in the embodiments of the present disclosure may be arbitrarily combined to achieve different technical effects.

The foregoing is a specific description of preferred embodiments of the present disclosure. However, the present disclosure is not limited to the above embodiments, and those of ordinary skills in the art may also make various equivalent variations or replacements under shared conditions that do not violate the gist of the present disclosure, and these equivalent variations or replacements are all included within the scope defined by the claims of the present disclosure.

What is claimed is:

1. A data processing method based on secure multi-party computation, applied to a node server, comprising:

obtaining a plurality of pieces of original encrypted data from different data holding terminals, wherein the original encrypted data are obtained by performing a first encrypting process to original confidential data of the data holding terminals; the first encrypting process comprises: generating a second-order confidential vector based on the original confidential data, and performing a multiplication matrix operation based on shared key information and the second-order confidential vector to generate the original encrypted data; the shared key information is a maximum distance separable matrix with linear independent rows;

performing a service parsing process based on the plurality of pieces of the original encrypted data to generate encrypted result data; and sending the encrypted result data to a data reconstruction terminal, so that the data reconstruction terminal performs a reconstructing process to the encrypted result data according to the shared key information to obtain service result data;

wherein the plurality of pieces of the original encrypted data comprise first encrypted data and second encrypted data, and the obtaining a plurality of pieces of original encrypted data from different data holding terminals, comprises:

obtaining the first encrypted data $$\begin{pmatrix} s_1^a \\ s_2^a \\ \vdots \\ s_n^a \end{pmatrix} = \begin{pmatrix} 1 & -1 \\ 1 & -\alpha \\ \vdots & \vdots \\ 1 & -\alpha^{n-1} \end{pmatrix} \begin{pmatrix} a_1 \\ a_2 \end{pmatrix}$$

and the second encrypted data $$\begin{pmatrix} s_1^b \\ s_2^b \\ \vdots \\ s_n^b \end{pmatrix} = \begin{pmatrix} 1 & -1 \\ 1 & -\alpha \\ \vdots & \vdots \\ 1 & -\alpha^{n-1} \end{pmatrix} \begin{pmatrix} b_1 \\ b_2 \end{pmatrix},$$

wherein, $$\begin{pmatrix} a_1 \\ a_2 \end{pmatrix}$$

is a second-order confidential vector A, $$\begin{pmatrix} b_1 \\ b_2 \end{pmatrix}$$

is a second-order confidential vector B, $$\begin{pmatrix} 1 & -1 \\ 1 & -\alpha \\ \vdots & \vdots \\ 1 & -\alpha^{n-1} \end{pmatrix}$$

is the shared key information, $\alpha$ is a preset shared parameter of the shared key information, wherein n denotes a total number of processing nodes.

2. The method of claim 1, wherein the performing a service parsing process based on the plurality of pieces of the original encrypted data to generate encrypted result data, comprises:

performing the service parsing process to the first encrypted data and the second encrypted data based on a preset service parsing rule to generate the encrypted result data, wherein the service parsing rule is formed by a combination of a vector addition, a vector scalar multiplication or a vector multiplication.

3. The method of claim 2, wherein the node server comprises n processing nodes $P_1, P_2, \ldots, P_n$, the performing the service parsing process to the first encrypted data and the second encrypted data based on a preset service parsing rule to generate the encrypted result data, comprises:

when the service parsing rule is the vector multiplication, generating an intermediate parameter $d_i = s_i^a \cdot s_i^b$ by each processing node $P_i$ according to the first encrypted data and the second encrypted data, wherein the integer $i=1, 2, \ldots, n$;

sending the intermediate parameter $d_1$ generated by the processing node $P_1$ to the processing node $P_j$, wherein the integer $j \in [3, n]$;

sending the intermediate parameter $d_2$ generated by the processing node $P_2$ to the processing node $P_1$;

sending the intermediate parameter $d_j$ generated by the processing node $P_j$ to the processing node $P_2$;

generating a service encrypted vector $$s_1 = \frac{d_2 - \alpha d_1}{1 - \alpha},$$

in response to the processing node $P_1$ obtaining the intermediate parameter $d_2$;

generating a service encrypted vector $$s_j = \frac{d_j - \alpha^{j-2} d_1}{1 - \alpha^{j-2}},$$

in response to the processing node $P_2$ obtaining the intermediate parameter $d_j$;

generating a service encrypted vector $$s_{j-1} = \frac{d_j - \alpha^j d_1}{1 - \alpha^j},$$

in response to the processing node $P_j$ obtaining the intermediate parameter $d_1$;

generating the encrypted result data $$\begin{pmatrix} s_1 \\ s_2 \\ \vdots \\ s_n \end{pmatrix} = \begin{pmatrix} 1 & -\alpha \\ 1 & -\alpha^2 \\ \vdots & \vdots \\ 1 & -\alpha^n \end{pmatrix} \begin{pmatrix} a_1 b_1 \\ a_2 b_2 \end{pmatrix},$$

according to each service encrypted vector $s_i$.

4. A data processing method based on secure multi-party computation, applied to a data reconstruction terminal, comprising:

obtaining encrypted result data and shared key information, wherein the shared key information is a maximum distance separable matrix with linear independent rows, the encrypted result data are obtained by performing a service parsing process by a node server based on a plurality of pieces of original encrypted data, the original encrypted data are obtained by performing a first encrypting process to original confidential data of data holding terminals; the first encrypting process comprises: generating a second-order confidential vector based on the original confidential data, and performing a multiplication matrix operation based on the shared key information and the second-order confidential vector to generate the original encrypted data; the shared key information is a maximum distance separable matrix with linear independent rows; and performing a reconstructing process to the encrypted result data according to the shared key information to obtain service result data;

wherein the performing a reconstructing process to the encrypted result data according to the encrypted result data and the shared key information to obtain service result data, comprises:

parsing the encrypted result data to obtain encrypted service result data and an operation number r of vector multiplications corresponding to the encrypted result data;

obtaining a reconstructed matrix $$\begin{pmatrix} 1 & -\alpha^{r^2-1} \\ 1 & -\alpha^{2^r} \\ \vdots & \vdots \\ 1 & -\alpha^{2^r+n-2} \end{pmatrix}$$

based on the operation number r of the vector multiplications and the shared key information, $\alpha$ is a preset shared parameter of the shared key information, wherein n denotes a total number of processing nodes; and performing a decrypting process to the encrypted service result data based on the reconstructed matrix to obtain the service result data.

5. An electronic device, comprising: a memory, and a processor, wherein the memory stores a computer program therein which, when executed by the processor, implements a data processing method based on secure multi-party computation, wherein the data processing method based on secure multi-party computation comprises:

obtaining a plurality of pieces of original encrypted data from different data holding terminals, wherein the original encrypted data are obtained by performing a first encrypting process to original confidential data of the data holding terminals; the first encrypting process comprises: generating a second-order confidential vector based on the original confidential data, and performing a multiplication matrix operation based on shared key information and the second-order confidential vector to generate the original encrypted data; the shared key information is a maximum distance separable matrix with linear independent rows;

performing a service parsing process based on the plurality of pieces of the original encrypted data to generate encrypted result data; and sending the encrypted result data to a data reconstruction terminal, so that the data reconstruction terminal perform a reconstructing process to the encrypted result data according to the shared key information to obtain service result data;

wherein the plurality of pieces of the original encrypted data comprise first encrypted data and second encrypted data, and the obtaining a plurality of pieces of original encrypted data from different data holding terminals, comprises:

obtaining the first encrypted data $$\begin{pmatrix} s_1^a \\ s_2^a \\ \vdots \\ s_n^a \end{pmatrix} = \begin{pmatrix} 1 & -1 \\ 1 & -\alpha \\ \vdots & \vdots \\ 1 & -\alpha^{n-1} \end{pmatrix} \begin{pmatrix} a_1 \\ a_2 \end{pmatrix}$$

and the second encrypted data $$\begin{pmatrix} s_1^b \\ s_2^b \\ \vdots \\ s_n^b \end{pmatrix} = \begin{pmatrix} 1 & -1 \\ 1 & -\alpha \\ \vdots & \vdots \\ 1 & -\alpha^{n-1} \end{pmatrix} \begin{pmatrix} b_1 \\ b_2 \end{pmatrix},$$

wherein, $$\begin{pmatrix} a_1 \\ a_2 \end{pmatrix}$$

is a second-order confidential vector A, $$\begin{pmatrix} b_1 \\ b_2 \end{pmatrix}$$

is a second-order confidential vector B, $$\begin{pmatrix} 1 & -1 \\ 1 & -\alpha \\ \vdots & \vdots \\ 1 & -\alpha^{n-1} \end{pmatrix}$$

is the shared key information, $\alpha$ is a preset shared parameter of the shared key information, wherein n denotes a total number of processing nodes.

6. A computer readable storage medium storing a program which, when executed by a processor, implements a data processing method based on secure multi-party computation, wherein the data processing method based on secure multi-party computation comprises:

obtaining a plurality of pieces of original encrypted data from different data holding terminals, wherein the original encrypted data are obtained by performing a first encrypting process to original confidential data of the data holding terminals; the first encrypting process comprises: generating a second-order confidential vector based on the original confidential data, and performing a multiplication matrix operation based on shared key information and the second-order confidential vector to generate the original encrypted data; the shared key information is a maximum distance separable matrix with linear independent rows;

performing a service parsing process based on the plurality of pieces of the original encrypted data to generate encrypted result data; and sending the encrypted result data to a data reconstruction terminal, so that the data reconstruction terminal performs a reconstructing process to the encrypted result data according to the shared key information to obtain service result data;

wherein the plurality of pieces of the original encrypted data comprise first encrypted data and second encrypted data, and the obtaining a plurality of pieces of original encrypted data from different data holding terminals, comprises:

obtaining the first encrypted data $$\begin{pmatrix} s_1^a \\ s_2^a \\ \vdots \\ s_n^a \end{pmatrix} = \begin{pmatrix} 1 & -1 \\ 1 & -\alpha \\ \vdots & \vdots \\ 1 & -\alpha^{n-1} \end{pmatrix} \begin{pmatrix} a_1 \\ a_2 \end{pmatrix}$$

and the second encrypted data $$\begin{pmatrix} s_1^b \\ s_2^b \\ \vdots \\ s_n^b \end{pmatrix} = \begin{pmatrix} 1 & -1 \\ 1 & -\alpha \\ \vdots & \vdots \\ 1 & -\alpha^{n-1} \end{pmatrix} \begin{pmatrix} b_1 \\ b_2 \end{pmatrix},$$

wherein, $$\begin{pmatrix} a_1 \\ a_2 \end{pmatrix}$$

is a second-order confidential vector A, $$\begin{pmatrix} b_1 \\ b_2 \end{pmatrix}$$

is a second-order confidential vector B, $$\begin{pmatrix} 1 & -1 \\ 1 & -\alpha \\ \vdots & \vdots \\ 1 & -\alpha^{n-1} \end{pmatrix}$$

is the shared key information, $\alpha$ is a preset shared parameter of the shared key information, where n denotes a total number of processing nodes.

7. An electronic device, comprising: a memory, and a processor, wherein the memory stores a computer program therein which, when executed by the processor, implements a data processing method based on secure multi-party computation, wherein the data processing method based on secure multiparty computation comprises:

obtaining encrypted result data and shared key information, wherein the shared key information is a maximum distance separable matrix with linear independent rows, the encrypted result data are obtained by performing a service parsing process by a node server based on a plurality of pieces of original encrypted data, the original encrypted data are obtained by performing a first encrypting process to original confidential data of data holding terminals, the first encrypting process comprises: generating a second-order confidential vector based on the original confidential data, and performing a multiplication matrix operation based on the shared key information and the second-order confidential vector to generate the original encrypted data; the shared key information is a maximum distance separable matrix with linear independent rows; and performing a reconstructing process to the encrypted result data according to the shared key information to obtain service result data;

wherein the performing a reconstructing process to the encrypted result data according to the encrypted result data and the shared key information to obtain service result data, comprises:

parsing the encrypted result data to obtain encrypted service result data and an operation number r of vector multiplications corresponding to the encrypted result data;

obtaining a reconstructed matrix $$\begin{pmatrix} 1 & -\alpha^{r^2-1} \\ 1 & -\alpha^{2^r} \\ \vdots & \vdots \\ 1 & -\alpha^{2^r+n-2} \end{pmatrix}$$

based on the operation number r of the vector multiplications and the shared key information, $\alpha$ is a preset shared parameter of the shared key information, wherein n denotes a total number of processing nodes, and performing a decrypting process to the encrypted service result data based on the reconstructed matrix to obtain the service result data.

8. A computer readable storage medium storing a program which, when executed by a processor, implements a data processing method based on secure multi-party computation, wherein the data processing method based on secure multi-party computation comprises:

obtaining encrypted result data and shared key information, wherein the shared key information is a maximum distance separable matrix with linear independent rows, the encrypted result data are obtained by performing a service parsing process by a node server based on a plurality of pieces of original encrypted data, the original encrypted data are obtained by performing a first encrypting process to original confidential data of data holding terminals; the first encrypting process comprises: generating a second-order confidential vector based on the original confidential data, and performing a multiplication matrix operation based on the shared key information and the second-order confidential vector to generate the original encrypted data; the shared key information is a maximum distance separable matrix with linear independent rows; and performing a reconstructing process to the encrypted result data according to the shared key information to obtain service result data;

wherein the performing a reconstructing process to the encrypted result data according to the encrypted result data and the shared key information to obtain service result data, comprises:

parsing the encrypted result data to obtain encrypted service result data and an operation number r of vector multiplications corresponding to the encrypted result data;

obtaining a reconstructed matrix $$\begin{pmatrix} 1 & -\alpha^{r^2-1} \\ 1 & -\alpha^{2^r} \\ \vdots & \vdots \\ 1 & -\alpha^{2^r+n-2} \end{pmatrix}$$

based on the operation number r of the vector multiplications and the shared key information, $\alpha$ is a preset shared parameter of the shared key information, wherein n denotes a total number of processing nodes; and performing a decrypting process to the encrypted service result data based on the reconstructed matrix to obtain the service result data.

\* \* \* \* \*

UNITED STATES PATENT AND TRADEMARK OFFICE
CERTIFICATE OF CORRECTION

| | | |
|---|---|---|
| PATENT NO. | : 11,853,449 B1 | Page 1 of 3 |
| APPLICATION NO. | : 18/181972 | |
| DATED | : December 26, 2023 | |
| INVENTOR(S) | : Ximing Fu et al. | |

It is certified that error appears in the above-identified patent and that said Letters Patent is hereby corrected as shown below:

On the Title Page

Column 3, Assignee, Line 3, delete "Rearch" and insert -- Research --

In the Claims

Column 23, Lines 41-45, Claim 3, delete "$s_j = \dfrac{d_j - \alpha^{j-2} d_1}{1 - \alpha^{j-2}},$" and insert -- $s_j = \dfrac{d_j - \alpha^{j-2} d_2}{1 - \alpha^{j-2}},$ --

Column 24, Lines 35-40, Claim 4, delete "$\begin{pmatrix} 1 & -\alpha^{2^j-1} \\ 1 & -\alpha^{2^j} \\ \vdots & \vdots \\ 1 & -\alpha^{2^j+k-2} \end{pmatrix}$" and insert Signed and Sealed this
Thirteenth Day of February, 2024

Katherine Kelly Vidal
*Director of the United States Patent and Trademark Office*

CERTIFICATE OF CORRECTION (continued)
U.S. Pat. No. 11,853,449 B1

$$\begin{pmatrix} 1 & -\alpha^{2^r-1} \\ 1 & -\alpha^{2^r} \\ \vdots & \vdots \\ 1 & -\alpha^{2^r+n-2} \end{pmatrix}$$

-- --

Column 25, Lines 5-6, Claim 5, delete "perform" and insert -- performs --

Column 26, Line 57, Claim 6, delete "where" and insert -- wherein --

Column 26, Line 64, Claim 7, delete "multiparty" and insert -- multi-party --

Column 27, Lines 6, Claim 7, delete "terminals," and insert -- terminals; --

Column 27, Lines 27-32, Claim 7, delete "$\begin{pmatrix} 1 & -\alpha^{2^r-1} \\ 1 & -\alpha^{2^r} \\ \vdots & \vdots \\ 1 & -\alpha^{2^r+n-2} \end{pmatrix}$" and insert $$\begin{pmatrix} 1 & -\alpha^{2^r-1} \\ 1 & -\alpha^{2^r} \\ \vdots & \vdots \\ 1 & -\alpha^{2^r+n-2} \end{pmatrix}$$

-- --

CERTIFICATE OF CORRECTION (continued)
U.S. Pat. No. 11,853,449 B1

Column 28, Lines 32-36, Claim 8, delete "$\begin{pmatrix} 1 & -\alpha^{2^r-1} \\ 1 & -\alpha^{2^r} \\ \vdots & \vdots \\ 1 & -\alpha^{2^r+n-2} \end{pmatrix}$" and insert --$\begin{pmatrix} 1 & -\alpha^{2^r-1} \\ 1 & -\alpha^{2^r} \\ \vdots & \vdots \\ 1 & -\alpha^{2^r+n-2} \end{pmatrix}$--